H. SCHRÖDER.
ELECTROMOTOR WITH CONNECTING GEAR.
APPLICATION FILED DEC. 22, 1919.

1,428,302.

Patented Sept. 5, 1922.

Inventor
Heinrich Schröder.

By

Attorney

Patented Sept. 5, 1922.

1,428,302

UNITED STATES PATENT OFFICE.

HEINRICH SCHRÖDER, OF SHEDINGHAUSEN, GERMANY, ASSIGNOR TO LANDWIRT-SCHAFTLICHE MASCHINEN-GESELLSCHAFT, OF HEMELINGEN, NEAR BREMEN, GERMANY.

ELECTROMOTOR WITH CONNECTING GEAR.

Application filed December 22, 1919. Serial No. 346,804.

*To all whom it may concern:*

Be it known that I, HEINRICH SCHRÖDER, citizen of Germany, residing at Shedinghausen, Sykerstr. 1, Germany, have invented certain new and useful Improvements in Electromotors with Connecting Gears (for which I have obtained a patent in Germany, No. 287,475, Aug. 14, 1915), of which the following is a specification.

Electromotors with toothed connecting gears are used for numerous purposes. The power transmission from the motor to the machine is generally effected either through driving belts, cords chains or by means of direct coupling of the shafts.

Electromotors which are directly coupled with the machines can be used generally for the driving of one machine only. The other known means for power transmission can be employed with light machines only if the machines to be driven are securely fixed in such a manner that they can be fitted with the necessary devices for the application of a driving belt, whereby much space is required.

This invention has for its object to do away with all such connection so that any machine which is driven by crank can in future be driven in the simplest manner by means of an electromotor.

With this object in view the electromotor is portable and provided with a toothed gearing through which the proper rate of speed can be obtained. The power transmission is effected through direct coupling of the shafts, whereby a secure and stable connection of the apparatus with the working machine results. For this purpose the electromotor is securely mounted upon a guiding arm fixed to the machine, the electromotor being secured in position by means of clamping screws.

The technical progress resulting from such an arrangement as compared with the devices generally used and of known construction consists therein that almost any small machine such as centrifuges churns, washing machines, mangling machines, pumps and the like can be connected with the apparatus in the manner described without essential modification.

Compared with other driving gears the improved connecting gear offers this advantage that the machines do not require so much space as would be necessary if transmissions are used. The electromotor is merely pushed upon the guiding arm and fixed upon the same by means of the clamping screws. In order to account for the different rates of speed of starting the various machines, the apparatus is provided with a hand crank by means of which the working machine and the electromotor together are slowly started. The motor is coupled only when the proper number of rotations has been reached. With machines such as centrifuges a direct coupling could not be effected without this starting arrangement. A further advantage of this arrangement is that no work for starting is required from the electromotor.

In the accompanying drawings the invention is shown by way of example.

Figure 1:
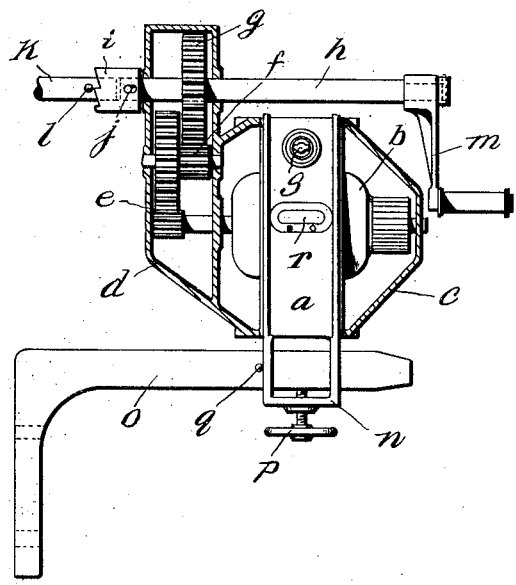
Fig. 1 is a partial longitudinal section of Fig. 2.
Figure 2:
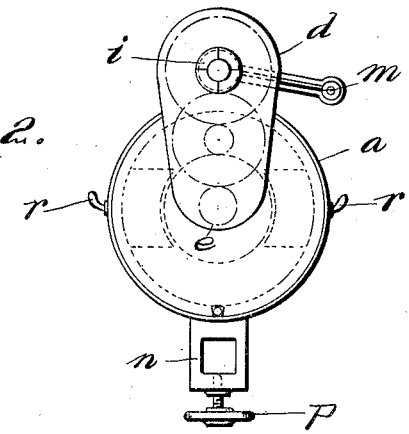
Fig. 2 is a front view of Fig. 1 seen from the coupling side.

The electromotor can be of any convenient and generally known construction. The pole-casing is designated by $a$, the anchor by $b$, the front- and rear bearing plates by $c$ and $d$ respectively. The front bearing-plate serves at the same time as gear-casing for the toothed gear. In the drawings a single gear is shown which consists of the two sets of toothed wheels $e$ and $f$—$g$; there can however be used several pairs of toothed gears if different rates of rotation are to be obtained.

The large toothed wheel $g$ of the gear is fixed upon the shaft $h$. This shaft $h$ carries at its front end a coupling sleeve $i$ adapted to be moved longitudinally upon shaft $h$ but secured against rotation by a locking pin $j$. The coupling sleeve $i$ fits the shaft $k$ of the machine to be driven which is taken along through the intermediary of the coupling pin $l$ if the sleeve $i$ is in the coupling position. If the motor is stopped the sleeve $l$ moves back so that the electromotor is uncoupled. The connection of the shafts can however be effected by any other coupling device of suitable construction. A crank handle $m$ is mounted upon the other end of shaft $h$. A bracket $n$ is fixed to the pole-casing $a$ adapted to properly fit upon an arm $o$ projecting from the machine to be driven. The electromotor is secured in the proper position by means of a clamping screw *p*. An abutment pin *q* projecting from the arm *o* serves for ensuring the proper position of the electromotor on said arm *o* in order to properly couple the shafts. The pole-casing *h* has two handles *r r*. The current is supplied by means of cable and contact pin. The improved connecting gear can be easily mounted on any machine as it simply requires the guide arm *o* of the machine to be driven and the pin *l* upon the driving shaft *k*. The device is used as follows:

The electromotor, held with the two handles *r, r* is pushed upon the arm *o* until the bracket *n* abuts against the abutment pin *q*. The clamping screw *p* is screwed home and the electromotor is thus securely fixed in position. The coupling sleeve *i* has thus been pushed over shaft *k* so that pin *l* engages with the corresponding groove. Hereupon the crank handle *n* is slowly turned until the proper number of rotations is attained and the switch *s* is turned to switch on the electromotor. In this manner machines which work with great transmission such as centrifuges and the like can be slowly started and no great strain is exerted upon the electromotor and the connecting gear during the starting.

I claim:

1. An improved electromotor with connecting gear comprising in combination with the electromotor a driving shaft of the same, a coupling sleeve movably mounted upon the front end of said shaft, a bracket extending from the motor casing, an arm projecting from the machine to be driven adapted to receive the said bracket of the electromotor, a clamping screw in said bracket for fixing the motor upon said arm an abutment pin upon said arm of the machine to be driven for securing the proper position of the electromotor with regard to the machine and a pin projecting from the shaft of the driven machine adapted to engage with the said coupling sleeve substantially as described and shown.

2. An improved electromotor with connecting gear comprising in combination with the electromotor a driving shaft of the same, a coupling sleeve movably mounted upon the front end of said shaft, a bracket extending from the motor casing, an arm projecting from the machine to be driven adapted to receive the said bracket of the electromotor, a clamping screw in said bracket for fixing the motor upon said arm, an abutment pin upon said arm of the machine to be driven for securing the proper position of the electromotor with regard to the machine and a pin projecting from the shaft of the driven machine adapted to engage with the said coupling sleeve and a hand crank at the free end of the driving shaft for starting by hand the machine to be driven and the electromotor before the said electromotor is switched on.

In testimony whereof I affix my signature in presence of two witnesses.

HEINRICH SCHRÖDER.

Witnesses:
   H. M. CISSNER,
   K. K. MAURY.